(12) United States Patent
Browning et al.

(10) Patent No.: US 8,473,565 B2
(45) Date of Patent: Jun. 25, 2013

(54) ABSTRACTING SPECIAL FILE INTERFACES TO CONCURRENTLY SUPPORT MULTIPLE OPERATING SYSTEM LEVELS

(75) Inventors: Luke M. Browning, Austin, TX (US); Mallesh K. Lepakshaiah, Hebbal Kempapura (IN); Kavitha Ramalingam, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 461 days.

(21) Appl. No.: 12/879,163

(22) Filed: Sep. 10, 2010

(65) Prior Publication Data

US 2012/0066333 A1 Mar. 15, 2012

(51) Int. Cl.
*G06F 15/167* (2006.01)

(52) U.S. Cl.
USPC ........... 709/212; 709/202; 709/215; 709/226; 709/230

(58) Field of Classification Search
USPC .......................... 709/202, 212, 215, 226, 230
See application file for complete search history.

(56) References Cited

U.S. PATENT DOCUMENTS

| | | | |
|---|---|---|---|
| 6,802,068 B1 * | 10/2004 | Guruprasad | 719/319 |
| 8,176,294 B2 * | 5/2012 | Frank | 711/202 |
| 8,214,544 B2 * | 7/2012 | Chatterjee et al. | 710/9 |
| 2007/0271557 A1 * | 11/2007 | Geisinger | 717/163 |
| 2007/0288247 A1 * | 12/2007 | Mackay | 705/1 |
| 2011/0066948 A1 * | 3/2011 | Tsao | 715/739 |
| 2011/0125799 A1 * | 5/2011 | Kandasamy et al. | 707/785 |

OTHER PUBLICATIONS

Alvim, Daniela et al., "Protecting Kernel Code and Data with a Virtualization-Aware Collaborative Operating System", *Department of Computer Science University of California at Davis Honolulu, Hawaii 2009 Annual Computer Security Applications Conference* ISBN: 978-0/7695-3919-5 Dec. 7, 2009 , 10 pages.

* cited by examiner

*Primary Examiner* — Michael Won
(74) *Attorney, Agent, or Firm* — DeLizio Gilliam, PLLC

(57) ABSTRACT

Some embodiments of the inventive subject matter are directed to detecting a request to access a symbol via a special file that accesses kernel memory directly. The request can come from an application from a first instance of an operating system (OS) running a first version of the OS. A second instance of the OS, which manages the first OS, receives the request. The second instance of the OS includes a kernel shared between the first and second instances of the OS. The second instance of the OS runs a second version of the OS. Some embodiments are further directed to detecting data associated with the symbol, where the data is in a first data format that is compatible with the second version of the OS but is incompatible with the first version of the OS. Some embodiments are further directed to reformatting the data from the first data format to a second data format compatible with the second version of the OS.

17 Claims, 7 Drawing Sheets kmem_cre.h

//define known symbol types
define KMEM_SYM_ID_StructX 1
define KMEM_SYM_ID_StructY 2    463
define KMEM_SYM_ID_StructZ 3

261

210

| 0x6600 | s_symid | s_size | s_addr | s_type  | s_cre   | ... | s_handler | s_eptrs |
|--------|---------|--------|--------|---------|---------|-----|-----------|---------|
|        | 1       | 24     | 0x100  | complex | AIX 5.2 | ... | Func a    | 0x7800  |
|        | 2       | 4      | 0      | simple  | AIX 5.2 | ... | Func b    | 0       |
|        | 3       | 4      | 0      | simple  | AIX 5.2 | ... | Func c    | 0       |

| 0x7800 | se_id | se_offset | se_offset size | se_offset_type | se_next |
|--------|-------|-----------|----------------|----------------|---------|
|        | 2     | 0x0008    | 8              | Absolute       | 0x7900  |
| 0x7900 | 3     | 0x0010    | 8              | Absolute       | 0       |

FIG. 2

ABSTRACTING SPECIAL FILE INTERFACES TO CONCURRENTLY SUPPORT MULTIPLE OPERATING SYSTEM LEVELS

BACKGROUND

Embodiments of the inventive subject matter generally relate to the field of operating systems, and, more particularly, to abstracting special file interfaces to concurrently support multiple operating system levels.

Operating system virtualization is a technology that can divide a single host, such as a server, into multiple parts, or partitions, each running a separate instance, or image, of an operating system (OS). The instances of the operating systems are separate, or isolated, from each other in some ways. For example, the instances of the operating systems have separate file systems, separate users, separate applications, and separate processes. In other ways, however, the instances of the operating systems are not separate and can share some resources of the host. For example, the instances of the operating systems can share the memory, the kernel, the processors, the network cards, the hard drives, and/or other software, firmware, and/or hardware of the host. Thus, each instance of the operating system can look and feel like a separate server or machine from the point of view of its users. However, because the instances of the operating system share resources of the host, the instances of the operating systems are not actually separate devices. The instances of the operating system are commonly referred to as "virtual" or "virtualized" operating systems (virtual OS's). In similar contexts, virtualized operating systems are also referred to as virtual partitions, virtual machines, virtual environments, or virtual servers.

Virtual OS's can be implemented in different ways. One way is for an administrative user to create a logical partition (LPAR) on a host and install an instance of an operating system on the LPAR. The administrative user can create a logical partition (LPAR) by dividing a portion, or subset, of the host's hardware resources, such as processors, memory, and storage. The administrative user can isolate the LPAR from other LPARs running on the same device or machine. Specifically, the administrative user isolates the subset of the host's hardware resources from other subsets, so that multiple LPARs can run on the host, with each LPAR running independently of each other, as if each LPAR was a separate machine. The administrative user can install an instance of the operating system on an LPAR. The instance of the operating system can run its own applications in a way that is separate and isolated from any other LPAR. The number of LPARs that can be created on a host, however, depends on the number of the host's resources available. For example, to create an LPAR, an administrative user must physically partition a portion of the host's memory and assign the portion of the host's memory to the LPAR. Because LPARs have separation at the hardware level, LPARs are very stable, can run different versions of an operating system, and provide a very high degree of isolation from other LPARs.

A different way to create a virtual OS is to form a workload partition (WPAR). WPARs were introduced in the IBM® AIX® 6.1 operating system. WPARs are a software implementation of operating system virtualization. More specifically, WPARs are software partitions that are created from, run under, and share the resources of a managing instance of the operating system (OS). The managing instance of the OS may be referred to as a global environment or a global OS. Multiple WPARs can run on a single managing resource (e.g., on a single machine or on a single LPAR), which can all be managed by the global OS. An administrative user does not need to physically divide portions of the host's hardware to create a WPAR. Rather, the administrative user runs a command to generate a WPAR and the global OS creates and manages the WPAR as a software partition.

SUMMARY

Some embodiments include a computer program product for converting data associated with a symbol accessible via a special file for different versions of an operating system. The computer program product can include a computer readable storage medium having computer readable program code embodied therewith. The computer readable program code can be configured to access the data associated with the symbol in response to a request to access the symbol via the special file, wherein the special file is for accessing kernel memory directly, wherein an application of a first of a plurality of instances of the operating system requests the access to the symbol, wherein the symbol is accessible via a second of the plurality of instances of the operating system, wherein the second of the plurality of instances of the operating system manages the plurality of instances, wherein the plurality of instances of the operating system share a kernel, wherein the first of the plurality of the instances of the operating system is a first version of the operating system, wherein the second of the plurality of instances of the operating system is a second version of the operating system, and wherein the data is in a first data format that is compatible with the second version of the operating system. In some embodiments, the computer readable program code can further be configured to determine that the first data format for the data is incompatible with the first version of the operating system. In some embodiments, the computer readable program code can further be configured to convert the data from the first data format to a second data format that is compatible with the first version of the operating system. In some embodiments, the computer readable program code can further be configured to return the data in the second data format in response to the request to access the symbol.

Some embodiments are directed to an apparatus with a processing unit, a network interface, and an operating system. In some embodiments, the operating system is operable to, via the processing unit, access data associated with a symbol in response to a request to access the symbol via a special file, wherein the special file is for accessing kernel memory directly, wherein an application of a first of a plurality of instances of the operating system requests the access to the symbol, wherein the symbol is accessible via a second of the plurality of instances of the operating system, wherein the second of the plurality of instances of the operating system manages the plurality of instances, wherein the plurality of instances of the operating system share a kernel, wherein the first of the plurality of the instances of the operating system is a first version of the operating system, wherein the second of the plurality of instances of the operating system is a second version of the operating system, wherein the data is in a first data format that is compatible with the second version of the operating system, and wherein the special file is either a /dev/kmem special file or a /dev/mem special file managed by the second of the plurality of instances of the operating system. In some embodiments, the operating system is further operable to determine that the first data format for the data is incompatible with the first version of the operating system. In some embodiments, the operating system is further operable to convert the data from the first data format to a second data format that is compatible with the first version of the operating system. In some embodiments, the operating system is further operable to return the data in the second data format in response to the request to access the symbol.

Some embodiments include a computer program product for reformatting data associated with a symbol accessible via a special file for different versions of an operating system for one or more virtual operating systems. The computer program product can include a computer readable storage medium having computer readable program code embodied therewith. The computer readable program code can be configured to access the data associated with the symbol in response to a request to access the symbol via the special file, wherein the special file is for accessing kernel memory directly, wherein an application of a first of a plurality of instances of the operating system requests the access to the symbol, wherein the symbol is accessible via a second of the plurality of instances of the operating system, wherein the second of the plurality of instances of the operating system manages the plurality of instances, wherein the plurality of instances of the operating system share a kernel, wherein the first of the plurality of the instances of the operating system is a first version of the operating system, wherein the second of the plurality of instances of the operating system is a second version of the operating system, and wherein the data is in a first data format that is compatible with the second version of the operating system In some embodiments, the computer readable program code can further be configured to determine that the first data format for the data is incompatible with the first version of the operating system. In some embodiments, the computer readable program code can further be configured to reformat the data from the first data format into a second data format that is compatible with the first version of the operating system. In some embodiments, the computer readable program code can further be configured to detect a secondary data structure associated with the symbol. In some embodiments, the computer readable program code can further be configured to store information for the secondary data structure in a cache associated with a computing process of the first of the plurality of instances of the operating system used by the application to make the request to access the symbol. In some embodiments, the computer readable program code can further be configured to return the data in the second data format in response to the request to access the symbol.

BRIEF DESCRIPTION OF THE DRAWINGS

The present embodiments may be better understood, and numerous objects, features, and advantages made apparent to those skilled in the art by referencing the accompanying drawings.

FIGS. 2-4 are example conceptual diagrams of kernel structures used during translation of kernel data via special files for different versions of an operating system.

DESCRIPTION OF EMBODIMENT(S)

The description that follows includes exemplary systems, methods, techniques, instruction sequences, and computer program products that embody techniques of the present inventive subject matter. However, it is understood that the described embodiments may be practiced without these specific details. For instance, although examples refer to virtual operating systems that are managed by a global operating system, other instances may include virtual operating systems managed by hypervisors, virtual machine monitors, LPARs, other virtual operating systems, some combinations therefore, etc. In other instances, well-known instruction instances, protocols, structures, and techniques have not been shown in detail in order not to obfuscate the description.

The /dev/mem and /dev/kmem are special files (sometimes called device files), in Unix-based operating systems, that allow privileged processes to access (i.e., read or write) directly into system memory (e.g., physical memory or virtual memory). The use of /dev/mem and /dev/kmem special files is directly tied to a specific implementation of an operating system. Therefore, when the specific operating system is rewritten, the applications that utilize /dev/mem and /dev/kmem would need to be rewritten.

Some embodiments of the inventive subject matter include running one version of the operating system on the managing instance of the operating system, which manages multiple instances of previous versions of the operating system. However, the data structures accessed through the /dev/mem and /dev/kmem special files, for example, are stored in kernel memory and are programmed to be compatible with a native version of the operating system run by the managing instance of the operating system ("managing OS"). Some embodiments include kernel code that is configured to translate (e.g., remap and/or reformat), kernel data accessed via the /dev/mem and /dev/kmem special files to be compatible with a virtual operating system that runs a legacy version of the operating system. Some embodiments of the inventive subject matter, therefore, can translate data from a first data structure used by (i.e., compatible with) the native version to make sure the translated data is in a format compatible with what the application is expecting for the legacy version (i.e., compatible with the legacy version's use of the data). Thus, some embodiments provide a general framework for exposing specific symbols to applications. In some embodiments, the subsystem that owns the symbol registers the address of the symbol as well as a handler to be used to validate and translate the data associated with the symbol as expected by the application.

Figure 1:
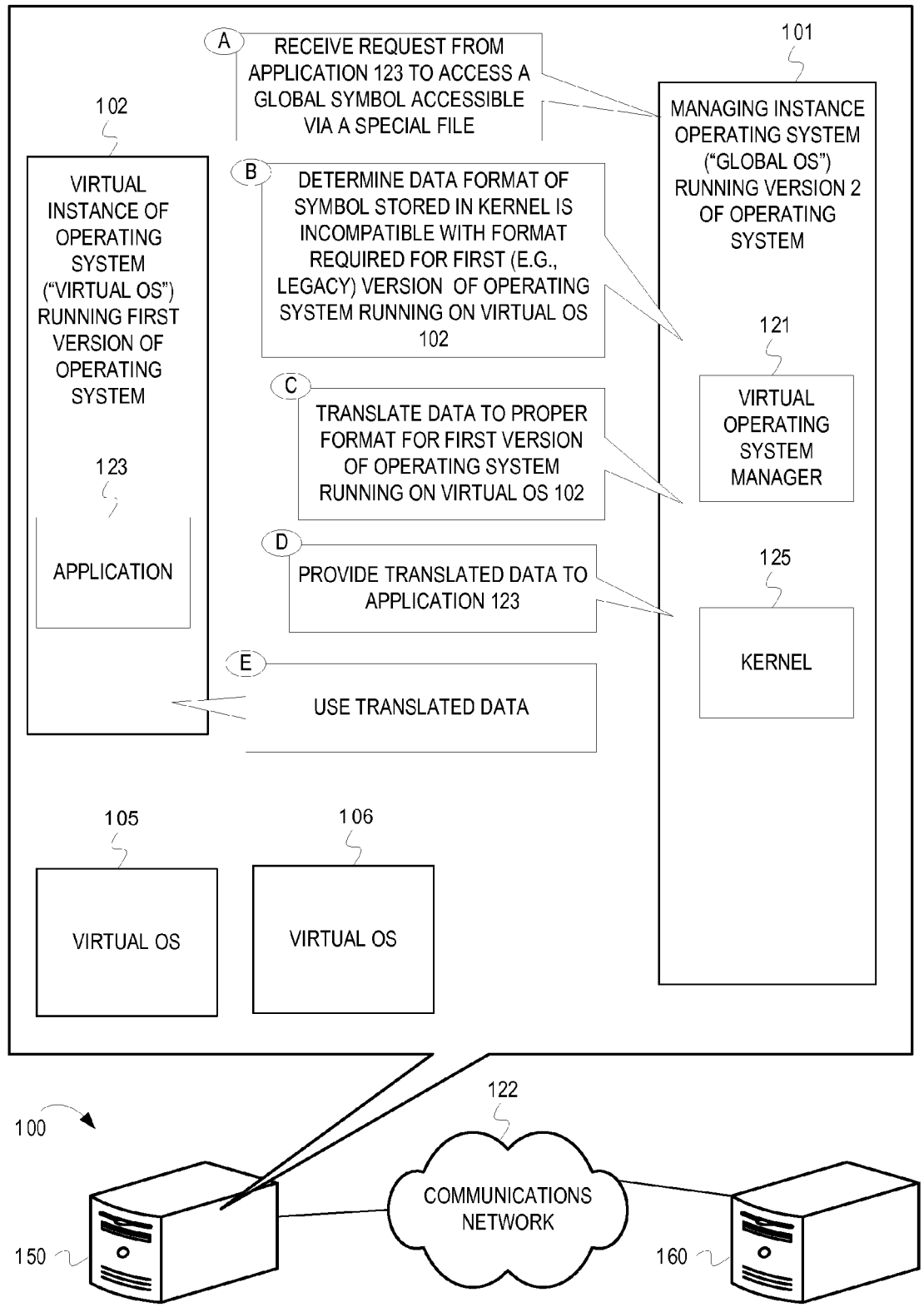
FIG. 1 is an example conceptual diagram of translating kernel data accessible via special files for different versions of an operating system.

FIG. 1 is an example conceptual diagram of translating kernel data accessible via special files for different versions of an operating system. In FIG. 1, a virtual OS management system ("system") 100 includes one or more devices that are connected to each other, such as computers 150 and 160 that are connected by a communications network 122. Other embodiments, however, may include logical partitions instead of and/or in addition to, computers 150 and 160. Each of the connected devices may have one or more instances of operating systems installed on the devices. For example, computer 150 may have installed a first instance of an operating system 101. The first instance of the operating system 101 may also be referred to as a managing operating system instance, or "global OS." The global OS 101 includes a virtual operating system manager 121 that manages multiple instances of virtual OS's that are installed on the devices (e.g., that are installed on one or more of the computers 150 and 160, that are installed on an LPAR, etc.). The global OS 101, for example, manages a second instance of the operating system 102. The second instance of the operating system 102 is a virtual OS ("virtual OS 102") that is installed on one of the devices (e.g., on the computer 150), but that also shares resources of the device (e.g., shares resources of the computer 150 with other virtual OS's that may be running on the computer 150). Virtual OS 102 runs a first version, or level, of the operating system and the global OS 101 runs a second, different, version, or level, of the operating system. The virtual operating system manager 121 is a module that can manage communications, activities, etc. for shared resources of the virtual OS's. For example, the virtual operating system manager 121 can control and manage use of a kernel 125 shared between multiple instances of operating systems (e.g., shared between the global OS 101, the virtual OS 102, and other virtual OS's 105 and 106 running on the computer 150). The system 100 includes the virtual operating system manager 121, the kernel 125, the global OS 101, the virtual OS's 102, 105, 106, and the application 123. Herein, when the system 100 is said to perform an action, any one of the appropriate components of the system 100 may perform the action.

At stage "A," the global OS 101 receives a request from an application 123 to access a global symbol accessible via a special file (e.g., the /dev/kmem special file). At stage "B" the kernel 125 can determine data (e.g. data in a primary data structure) associated with the global symbol stored in the kernel 125. The data may be incompatible with a format required for the first version (e.g., legacy version) of the operating system running on the virtual OS 102. Then, at stage "C" the kernel 125 can translate the data to a proper format for the first version of the operating system. At stage "D" the kernel 125 can provide the translated data to the application 123, and at stage "E," the application 123 uses the translated data.

Figure 3:
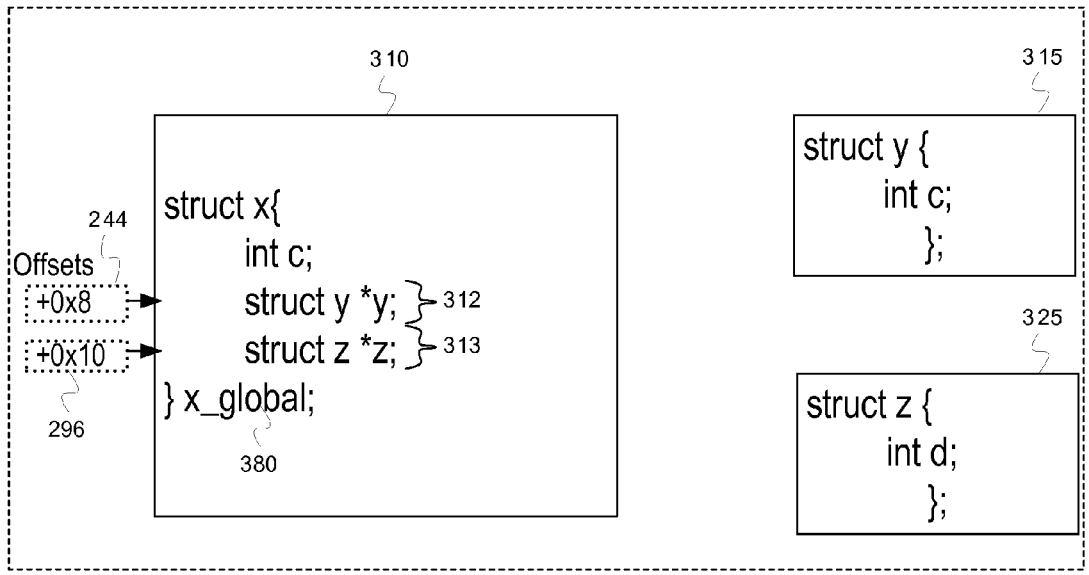
Figure 3:
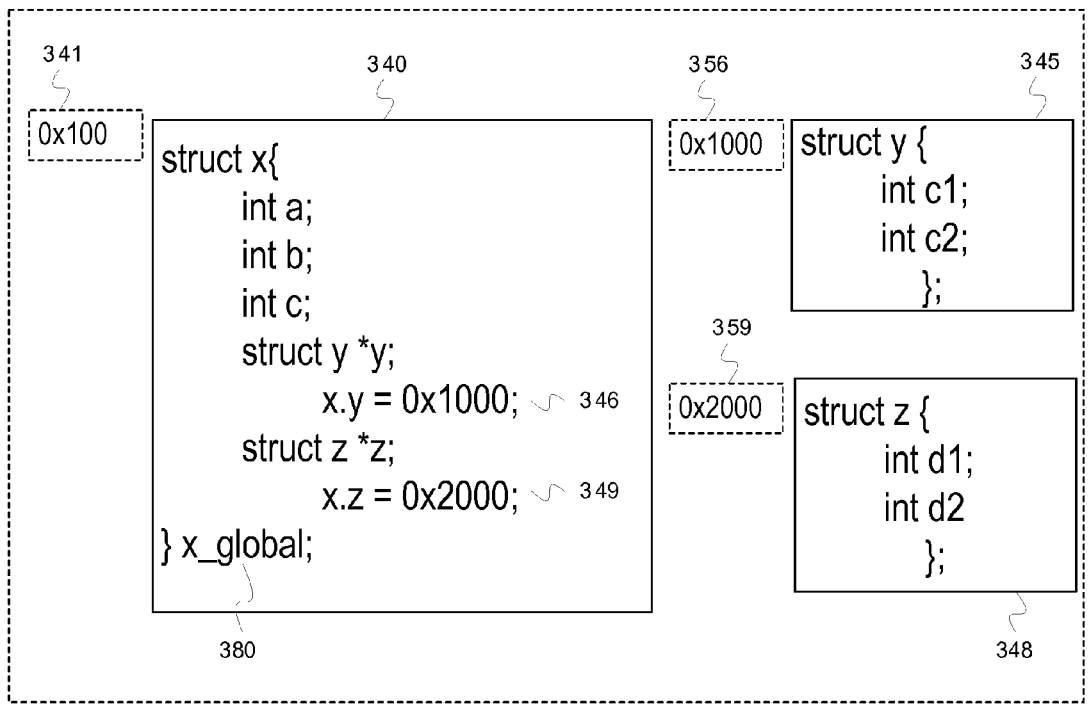
Figure 4:
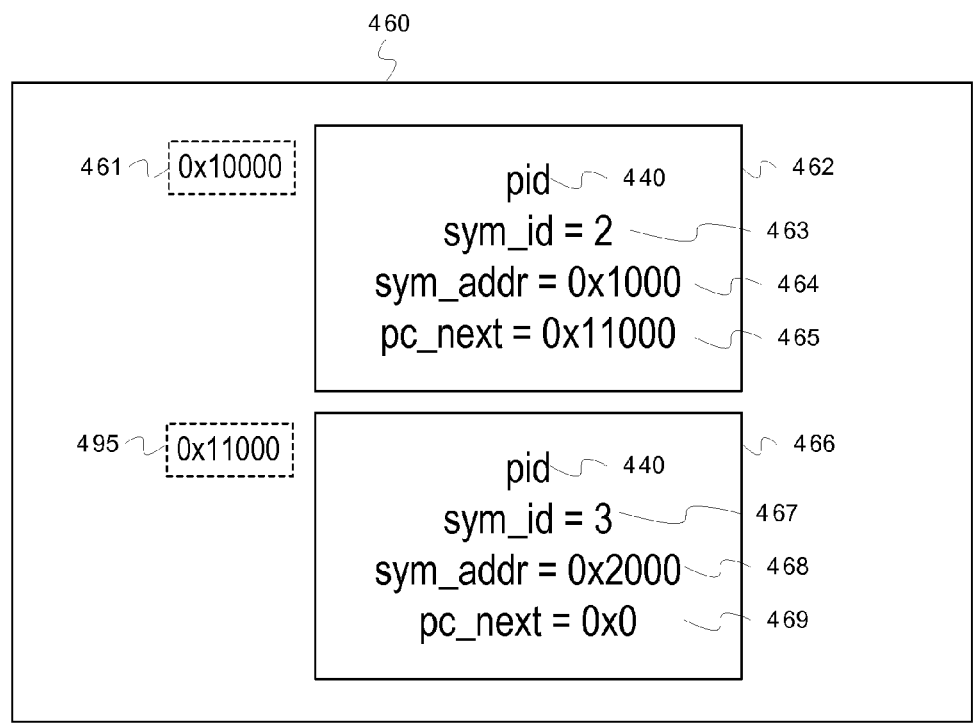

FIGS. 2-4 are example conceptual diagrams of structures used during translation of kernel data via special files for different versions of an operating system. FIGS. 2-4 will be referred to in more detail below in connection with the description of the flow of FIGS. 5-6. In FIG. 2, for example, a system (e.g., a virtual operating system management system, a virtual operating system manager, a virtual operating system compatibility module, an operating system, a kernel, etc.) can initiate a managing, or global, operating system that runs one version (e.g., a "native" version) of the operating system. The system (e.g., via base kernel code or a subsystem like a virtual memory manager or process management area) can generate a global symbol table 210 and register some symbols in the global symbol table 210 that can be accessed via /dev/kmem or /dev/mem. The system can export the symbols stored in kernel memory and store information for the symbols to the global symbol table 210. The symbols can be part of a subsystem like process management. One example of a symbol is "avenrun" which is maintained by the scheduler, which is a part of process management. Avenrun reflects an average count of jobs waiting to run over different time intervals. Avenrun provides a measure of how busy processor(s) are.

The system stores information about the exported symbols in the global symbol table 210. Each of the exported symbols includes an entry in a symbol structure 290 within the global symbol table 210. The symbol structure 290 begins at a starting address 208 (e.g., at the physical address 0x6600) for the global symbol table 210. The entry for each symbol includes, for example, a symbol identifier field 201 (s_symid), a symbol size field 202 (s_size), an address field 203 (s_addr) describing an address in kernel memory at which data for the symbol is accessible, a symbol type field 204 (s_type) describing a type of the symbol (e.g., simple, array, complex), an operating system level field 205 (s_cre) describing a version of the operating system for which the data at the address is compatible, a handler identifier field 206 (s_handler), an embedded pointer address field 207 describing locations of embedded pointers, etc. The embedded pointer address field 207 points to an address value 209 for a complex type of symbol that requires linked lists to access all required data for the symbol. The global symbol table 210 can list in the symbol structure 290 the same symbol for each of multiple versions of the operating system. Each entry for the multiple versions can include separate OS levels, sizes, handlers, embedded pointers, etc. For each complex symbol, the system can also store embedded pointer information in an embedded pointer structure 291. The embedded pointer structure 291 can include several fields such as an embedded pointer identifier field 224 (se_id), an embedded pointer offset field 225, an offset size field 226, an offset type field 227 (se_offset_type), and a next pointer address field 228 (se_next).

In some embodiments, the system can dynamically load the /dev/kmem pseudo device driver ("kmem driver"). In other embodiments, the /dev/kmem pseudo driver can be preloaded, or built into, the kernel. The kmem driver can provide a service for registering additional symbols in the global symbol table that are accessible via the /dev/kmem. The service can be used by other drivers that are dynamically loaded into the kernel. The implementation of the /dev/kmem special file includes two parts: a common code (kmem driver), and handlers that are assigned to symbols stored in the global symbol table 210. In some embodiments, the system (e.g., via a global operating system code) initiates a virtual instance of the operating system ("virtual OS") such as a workload partition (WPAR), that runs a different version of the operating system (e.g., a version different from the "native" version). The virtual OS (e.g., WPAR code) creates a process associated with an application that loads within the virtual OS. The process associated with the application requests access to one of the symbols accessible via /dev/kmem or /dev/mem. The process opens, for example, the /dev/kmem special file and performs instructions that the kernel performs in parallel, such as, for example, the flow indicated in FIGS. 5-6.

Figure 5:
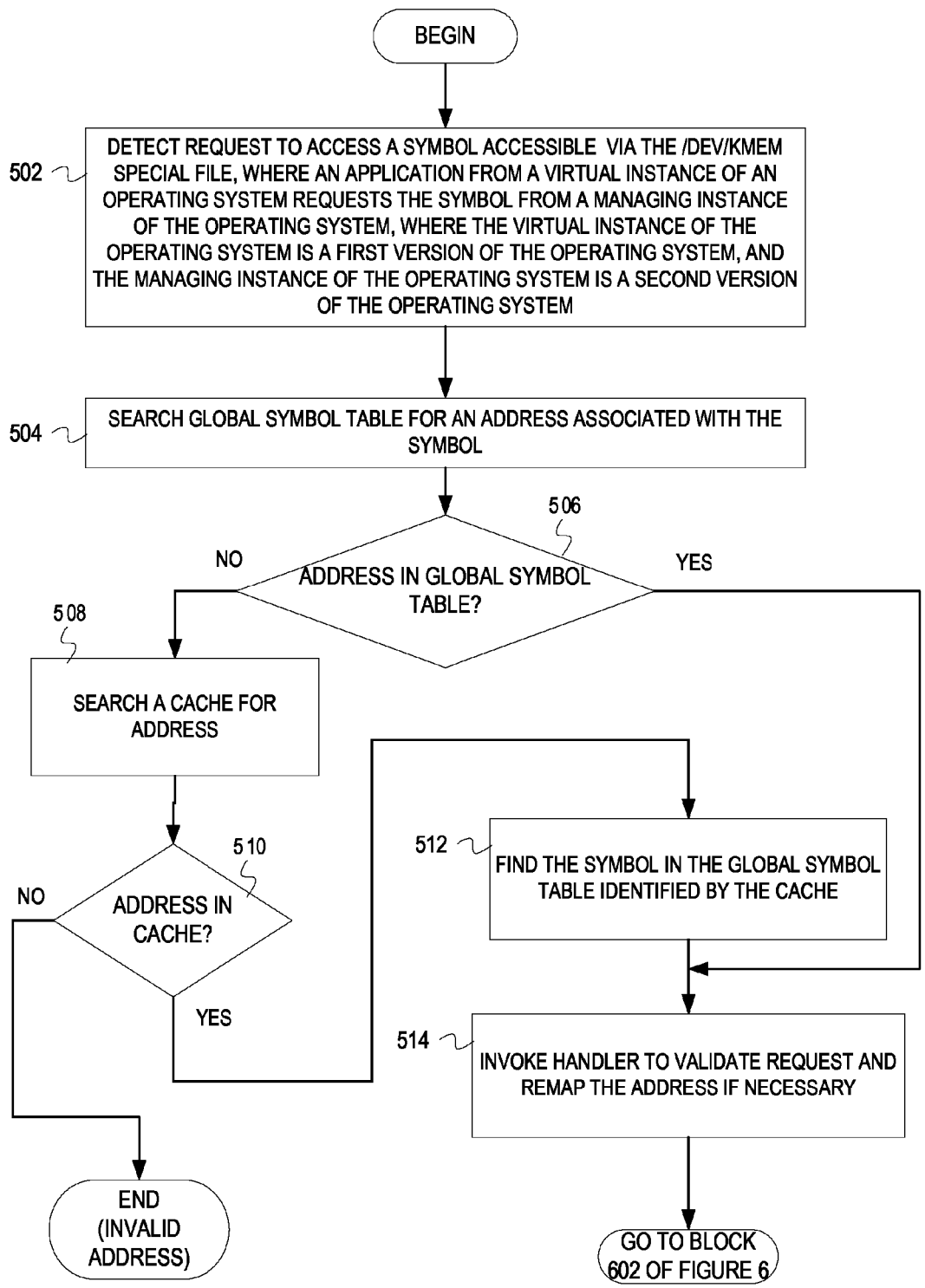
FIGS. 5-6 show a flowchart depicting example operations for detecting and translating data from data structures of global symbols accessible via specific Unix-based special files and tracking addresses for secondary data structures for use by an application from a virtual operating system having a different operating system level than a managing operating system.
Figure 6:
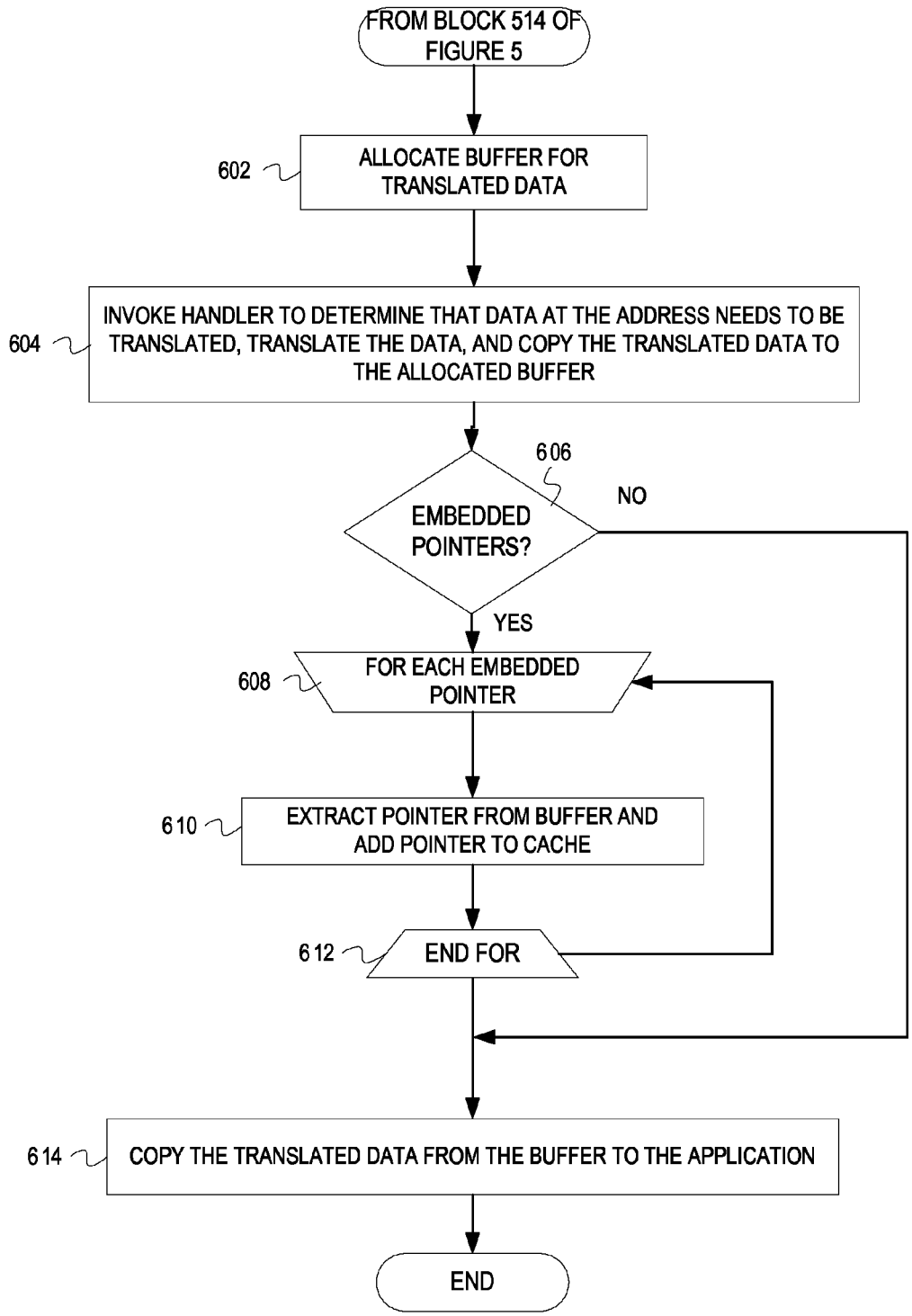

FIGS. 5-6 illustrate a flowchart depicting example operations for detecting and translating data from data structures of global symbols accessible via specific Unix-based special files and tracking addresses for secondary data structures for use by an application from a virtual operating system having a different operating system level than a managing operating system. For exemplary purposes, operations associated with the FIGS. 5-6 will be described as being performed by a system), such as by any or all of the elements described in FIGS. 1, 2, 3, 4 and/or FIG. 7 (e.g., a virtual operating system management system, a virtual operating system manager, a virtual operating system compatibility module, an operating system, a kernel, etc.). Further, FIGS. 5-6 describe an example of requests for data associated with symbols accessible via the /dev/kmem special file, however, it should be understood that a similar flow could be used to request data associated with symbols accessible via the /dev/mem special file or any other special file that directly accesses kernel memory in an operating system.

Referring to FIG. 5, the system detects a request to access a symbol accessible via the /dev/kmem special file (502). As stated previously, a managing OS manages the virtual OS and a shared kernel. The symbol may be accessible via the /dev/kmem special file, which is also managed by the managing OS. As described previously, the virtual OS is a first version (e.g., legacy version) of the operating system, and the managing OS is a second version (e.g., native version) of the operating system. Referring, momentarily to FIGS. 2 and 3, an application from the virtual OS can request the symbol 380 (e.g., "x_global") from the managing OS via the /dev/kmem special file. The global symbol table 210 is also managed by the managing OS. The symbol structure 290 of the global symbol table 210 includes a table entry ("entry") 211 that describes the symbol 380.

Returning to FIG. 5, the system searches the global symbol table for an address associated with the symbol (504). The address is a file pointer that is implicitly associated with /dev/kmem special file when the application opens the /dev/kmem special file. The file pointer is maintained by the kernel and advances on reads and writes according to the number of bytes read or written for the symbol in kernel memory. The address corresponds to a data structure associated with the symbol. For example, in FIG. 2, an address value 241 (i.e., the 0x100 value listed in the address field 203 of the entry 211) indicates a memory address (e.g., data address 341) of a primary data structure (data structure 340) associated with the symbol 380. The format of the data structure 340 is compatible with the first version (e.g., legacy version) of the operating system but not necessarily the second version (e.g., the native version) of the operating system. The registration of symbols is by operating system level, which includes the placement of embedded pointers. The global symbol table 210 explicitly describes structures for the first version of the operating system using the specified OS level (e.g., operating system level field 206), size (e.g., symbol size field 202), and embedded pointers (e.g., embedded pointer address field 207). A handler (e.g., handler identifier field 206) is also described which will be called at a later point described further below. The common code is not aware of structures. The handlers, however, are aware. The handlers enable subsystem owners to manage individual structures and can utilize new symbols without changing the common code. The handler translates data in a format compatible with a data structure from the second (native) version to another format compatible with a data structured expected by the first (legacy) version of the operations system and passes the translated data back to the common code, which extracts the pointers from the translated data. Information related to the extracted pointers is used to build a cache, but that information can only be generated after the handler has run. The handler translates the data according to the symbol definition that was registered for the specific version of the operating system.

Referring to FIG. 2, a handler 213 (i.e., the "Func a" code identified in the handler identifier field 206 of the entry 211) will determine whether the data structure 340 for the requested symbol is compatible with the second (native) version of the operating system. The application in the virtual OS opens the dev/kmem file, generates an array, stores the name of the symbol in the array, and uses the knlist system call to determine an address for the symbol (i.e., determine the offset for the symbol entry in the kernel memory). The knlist system call includes a loader subroutine that looks up the requested symbols. The knlist subroutine knows how to interpret the kernel symbol load map to find the address of the requested symbol. The virtual OS application, therefore, runs the knlist subroutine to obtain the offset of the symbol in kernel memory, which is contiguous like a file. The application runs an lseek subroutine, using the offset obtained from the knlist subroutine. The lseek advances the file pointer which is implicitly maintained by the kernel for the given open file instance, which was assigned to the calling process. The file pointer persists until the /dev/kmem file is closed. The lseek advances the pointer to the data address 341. The address value 241 for the data address 341 is stored in the symbol structure 290 of the global symbol table 210 (in the address field 203) as registered by the subsystem that wants to expose it to the application. The knlist subroutine stores the address in the array related to the symbol. The application can then read the array element and use the address value stored in the array element to direct a read operation.

Returning again to FIG. 5, the system can determine whether the address is found in the global symbol table (506). In the example described above, the system found the address value 241 in the symbol structure 290 of the global symbol table 210. If, however, the request made for the symbol was for a symbol that is not listed in the global symbol table 210, the system will search in a cache. The cache (e.g., process cache 460 shown in FIG. 4) contains addresses for secondary data structures associated with a symbol, such as secondary structures for embedded pointers. A discussion of how the cache may be populated with embedded pointers is described in further detail below at 608. Further, the portion of the flow associated with the operations for 508 and 510 will be discussed later in a different example. For now, the flow will continue along a path (i.e., continue to 514) assuming that the data address for the requested symbol was found in the global symbol table 210.

Returning again to FIG. 5, the system invokes a handler to validate the request and to remap the address if necessary (514). For example, as shown in FIGS. 2-3, the system reads the entry 211 and determines the handler 213 (e.g., "Func a"), which the system invokes. The system passes to the handler 213 the address value 241, an operating system level 242, a data structure size 243 required for the data format compatible with the first (legacy) version of the operating system, etc. The handler can verify that the size of the data requested by the application is equivalent to the data structure size 243 specified in the entry 211. The system can further lock the entry 211 in the global symbol table 210. For instance, the system can increment an "s_count" variable also stored in the entry 211 whenever the kmem driver looks up the symbol 380 and decrement the "s_count" after copying out the read symbol and updating the process cache, described further below. The system will access the entry 211 many times in the context a read system call. The count protects the caller's read reference. For instance, if some other process were to try to unload the kmem driver containing the symbol 380, the memory associated with that symbol would be freed. The lock prevents that from happening. It is a busy indicator. The system can also utilize a synchronization variable (e.g., s_synch), which holds the thread id of the sleeping thread until s_count reaches zero to avoid symbol un-registration when the entry 211 is being read by another process.

The handler can also remap the data address as needed. For instance before workload partitions (WPARs) were created and used, virtualized OS's relied on the global environment, or managing OS, to communicate exclusively with the kernel. All data structures described system use. When WPARs were added, many new structures were added to reflect individual WPAR use. Now, whenever a WPAR is created, the WPAR-specific structures are dynamically allocated. Therefore, those structures may not be found at a single address that can be exported. The use of /dev/kmem is a historical anachronism tied to the use of global structures. If /dev/kmem is invoked inside a WPAR, the system should reflect the WPAR's use of system resources. Thus, the system can map the global address to the specific WPARs address if one exists. In other words, in the context of the flow at 514, if the global symbol table includes an address that describes a data structure that applies to the system use of resources, the system can remap the address to a second, different, address that describes the calling WPAR's use of resources if one exists.

Otherwise, it does not re-map the specified address. When a data structure has been virtualized and partitioned to account for WPAR use that is know by the subsystem (though not known by the kmem driver), the kmem driver relies on the handler to keep track of whether a data structure has been virtualized and needs to be remapped or not. Therefore, the handler takes the address passed in by the application, after the symbol is looked up and validated, and the handler provides a mapping to the native data structure that should be read. In some embodiments, the data structure requested could be the same data structure as the native format if the global data structure can be applied to the virtual OS and every virtual OS has access to the same symbol. However, if the intention is to provide access to the specific data structure that applies to the calling WPAR, then it needs to be remapped and the handler does that.

In some cases, the system can optionally return a global system use. Alternatively, the system can prevent the symbol from being read from a WPAR (i.e., the system can fail the system call).

Thus, in some embodiments, the system can abstract and filter the use of the subsystem specific resources to reflect not the global system level use but the WPAR's use. For example, avenrun could be virtualized and partitioned to reflect the global use as well as individual WPAR use. In this case, there would be N+1 instances of the data structure—one for the global collective use ("1") and one for each WPAR ("N"). In this case, the handler would re-map the address to point at the structure associated with the calling WPAR (i.e., the WPAR from which the process is located). A WPAR may have the right to query its processor load average, but not other WPAR's load average nor the global environment's.

The flow continues in FIG. 6. After looking up the requested symbol in the symbol table and locking the entry 211, the system can allocate a buffer that will be used further below to store translated data (602). For example, the system previously invoked the handler 213 (e.g., invoked the "Func a") and provided the handler 213 with any information that the handler 213 needed to access the data structure 340 in memory, and to re-map the data structure 340 if necessary. For instance, the handler 213 is passed a command (e.g., "Map" or "Translate"), the address value 241, a symbol identifier 262, the operating system level identifier 242, and the buffer. The buffer contains either a pointer to re-map or a buffer to copy the translated data into. When invoked to re-map the address value 241, the buffer is allocated to hold a pointer. When invoked to translate the data at the given address 341 associated with the address value 241, the buffer is allocated according to the registered data structure size 243 in the global symbol table 210. The data at the data address 341 can be any data that a subsystem wants to register that is of interest to applications and which it deems readable by applications. The data, for example, can be one of three data types: simple, array, or complex.

Still referring to FIG. 6, the system invokes the handler to determine that the data at the data address needs to be translated, to translate the data, and to copy the translated data to the allocated buffer (604). The system (e.g., handler) can determine whether the data format of the data structure for the symbol is compatible with the first (legacy) version of the virtual instance of the operating system by comparing the specified operating system compatibility level (e.g., operating system level 242) to the operating system level of the data specified at the data address (e.g., at the address 341 specified by the address value 241). If the version of the virtual OS is not compatible, then the data format of the data structure at the data address (e.g., the data structure 340 at the data address 341) is not compatible with the semantics expected for the version of the operating system run by the virtual OS. For example, in the example of FIG. 2, the entry 211 includes the operating system level 242 that indicates a specific legacy operating system level (e.g., version 5.2). The operating system level 242, however, is different from a native version of the operations system run by the managing OS (e.g., version 7.1). The system is aware that the data structure 340, associated with the address value 241 specified in the entry 211, contains data in a format that is not compatible with the first (legacy) version of the operating system specified by the operating system level 242. The system (e.g., the handler 213) converts, or reformats, the data in the data format of the data structure 340 to a data format expected, or required, by the first (legacy) version of the operating system. In other words, the system performs operations that reformats data from the data structure 340 to be consistent, or in accordance, with the format (e.g., size, semantic structure, etc.) specified by a data structure 310 compatible with the first (legacy) version of the operating system. The system places the reformatted data in the buffer described previously. In yet other words, the system transforms and copies data associated with a first data instance to a second data instance that the system previously allocated. The second data instance is compatible with the first (legacy) instance of the operating system. The system returns the data in the second data instance.

Referring to FIG. 6, the system determines whether the symbol includes embedded pointers to secondary data structures (606). For example referring to FIG. 2, the system can perform a read of the entry 211 to determine whether there are any pointers to secondary data structures (e.g., for "complex" symbol types). The system reads a first-embedded-pointer entry address value (address value 209). The address value 209 (i.e., the 0x7800 value) is stored in the embedded pointer address field 207 for the entry 211. Returning momentarily to FIG. 6, if the system determines that a valid address exists, for example, in the embedded pointer address field 207 for the entry 211, then the flow continues at 608, otherwise the flow continues at 614.

Referring to FIG. 6, the system initiates a for loop (608) for each embedded pointer that the system accesses. For each embedded pointer encountered, the system extracts the pointer from the buffer and adds the pointer to the cache (610). For example, in FIGS. 2 and 3, after the system finds the address value 209, the system reads an address 233 in the embedded pointer structure 291 that corresponds to the address value 209. At the address 233 is a first-embedded-pointer entry ("entry") 222 in the embedded pointer structure 291. The system determines at the entry 222, a first offset value 244 (i.e., determines the 0x0008 value stored in the embedded pointer offset field 225 for the entry 222). The system needs to know how to interpret the pointer, such as whether the pointer's offset is relative or absolute. That is, the system needs to determine whether the pointer is calculated from the start of the data structure 310 or whether the pointer is located at an absolute address in kernel memory. The embedded pointer offset field 225 is provided for this purpose. If offset type is "relative," then the system needs to compute the address. The address of the secondary structure can be calculated by adding s_addr, s_size, and se_offset with the assumption that the structures, primary and secondary, are contiguous in memory. Otherwise, if the offset type is "absolute," then the system can read the value directly.

Next, the system uses the first offset value 244 (i.e., the 0x0008 value) to advance within the data structure 310 to a location or entry 312 that describes a data structure (e.g., the "struct y *y" statement). In this case, the common code finds the value 0x1000 that was placed there by the translation handler. This value and the corresponding se_id value are then placed in the process cache. This process is repeated for each embedded pointer associated with the structure being read. This information is used to validate subsequent read attempts of these structures. If the subsystem developer decides that the secondary structure should not be exposed to the application, then the translation handler clears the pointer (zero), but if it decides to expose the pointer to the application, the subsystem handler must ensure that the secondary structure is registered in the global table so that a handler may be associated with it. In this case, the s_addr field is zero as the cache serves the purpose of registering the address. One structure is read per read request. The process cache serves to validate the address associated with the next read request, as the addresses of secondary structures are not stored in the global symbol table.

The system writes a cache table entry in the process cache 460. The process cache ("cache") 460 describes the transient state of past read requests. The cache 460 grows as symbols are read. In essence, the cache 460 is a look-ahead buffer that anticipates the next read request. Complex symbols include linked lists of data that are linked and not necessarily physically contiguous in memory. All secondary structures have been previously registered with a symbol type, a handler, an address set to zero, etc. Applications like the kernel do not have an address for all of the secondary structures, only an address of the first structure that was stored in the global symbol table. Instead, the application and indirectly the kernel learn where secondary data structures are as they are read by examining its embedded pointers. In FIG. 4, the system generates the cache 460 and generates a first cache entry 462 at an address 461 (i.e., at memory address 0x10000). The first cache entry 462 includes data about the secondary data structure 345, such as the address value 464, which is equivalent to the address value 346 and which describes the address 356 of the secondary data structure 345. The system also writes a process identifier 440 that identifies the current process requesting the secondary data structure 345. The system also writes the symbol identifier 463 in the cache entry 462, which corresponds with the symbol identifier 463 in the embedded pointer identifier field 224 for the entry 222 of the global symbol table 210.

The system also creates an array 450 during boot with zero "active" entries as there are no virtual operating systems (e.g., WPARs) created during boot. Entries are allocated by the virtual OS manager 121 when an administrator starts a virtual OS (e.g. a WPAR). The array 450 identifies various virtual OS's that are running on a managing OS. For example, one entry 451 identifies a first virtual OS (e.g., a WPAR) that runs the application that requests the symbol 380. The entry 451 includes an identification number for the virtual OS (e.g., the "wpid" identifier, which equals the value "100"). The system can also track within the array 450 process caches for processes that run on the virtual OS's identified in the array 450. The entry 451 thus tracks the address 461 (i.e., the "pc=0x10000" value) of the first cache entry 462.

The for loop repeats if an additional embedded pointer is found, or else the for loop ends (612). For example, referring to FIG. 2, the system can determine if a second embedded pointer exists by reading the next pointer address field 228 for the entry 222. The system detects that a valid address value 232 (i.e., the address value 0x7900) exists, thus indicating that a second embedded pointer exists. If the value were zero, or was a non-valid address, then the system would determine that no additional embedded pointers exist. When the system detects the valid address value 232, then the system generates a second cache entry 466 (see FIG. 4) at an address 495 (i.e., 0x11000). The system then writes an address value 465 in the first cache entry 462. The address value 465 corresponds to the address 495. Again at FIG. 2, the system then reads a second embedded pointer entry ("entry") 223 in the embedded pointer structure 291 at an address 234 that corresponds with the valid address value 232. The entry 223 includes information regarding a second offset value 296 (i.e., the 0x0010 value) that the system can use to find, within the data structure 310 (see FIG. 3), an additional entry 313 that corresponds to an additional secondary data structure 325. The system then determines an address value 349 in the data structure 340 that corresponds to an address 359 of an additional secondary data structure 348 associated with the embedded pointer of the additional entry 313. The system writes data to the second cache entry 466 (see FIG. 4) including the process identifier 440 an additional symbol identifier 467 (which corresponds with the embedded pointer identifier field 224 for the entry 223), and an address value 468 (which is equivalent to the address value 349 and which corresponds to the address 359 for the additional secondary data structure 348). Again, at FIG. 2, the system also determines if any additional pointers exists by reading the next pointer address field 228 for the entry 223 and determining that a valid address does not exist and, therefore, no additional pointers exist. Back to FIG. 4, the system then writes a value of zero 469 in the second cache entry 466.

Further, referring again to FIG. 6, the system copies the translated data from the buffer to the application (614). The system can further unlock the entry 211 (e.g., decrement the s_count variable after both copying out the reformatted data from the data structure for the symbol and updating the process cache). The application can read the pointer in the buffer, lseek to that location, and then attempt to read it through /dev/kmem. One structure is read per read request, so the application must perform an lseek and read for each data structure that it wants to retrieve.

The system can perform the flow subsequent times, via one or more system calls, to access secondary data structures. For example, the application may request a symbol (e.g. symbol "Y"), which may be a symbol that is associated with the secondary data structure 345. Thus, in this example, the system can detect the request by the application for the symbol Y repeating 502 of the flow. The system can finds an address (e.g., address 246) associated with symbol Y in the translated buffer. However, the system will not find the address 246 in the global symbol table 210. Subsequently, the system can search the cache (508) for the address. The system, during the second pass of the flow, would determine, therefore, if the data address is in the cache (510). After the system finds the address in the cache, the system finds the symbol in the global symbol table identified by a symbol identifier in the cache (512). In one embodiment, for example, the system looks up the symbol using the symbol identifier 463 identified in the first cache entry 462, which corresponds to the symbol identifier 463 in a table entry ("entry") 212 of the global symbol table 210. The entry 212 includes a handler 214 ("Func b") that the system can then invoke (514) and continue through any or all parts of the flow similarly, as described previously, to remap and/or translate data (however, portions 606 through 610 of the flow may be skipped as the data structure 345 at address 356, which is identified in the first cache entry 462, has no embedded pointers).

If the system does not find the address in the cache, the address is invalid. Otherwise, if the system does find the address in the cache, then the system returns to the global symbol table using the symbol identifier 463, which is associated with the entry 212 of the symbol structure 290 of the global symbol table 210. The entry 212 includes information concerning a secondary data structure (e.g., secondary data structure 315) that comports with the first (legacy) version of the operating system. The symbol identifier 463 was previously defined in a library 261 (e.g., kmem_cre.h) that defines known symbols and was used.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 7:
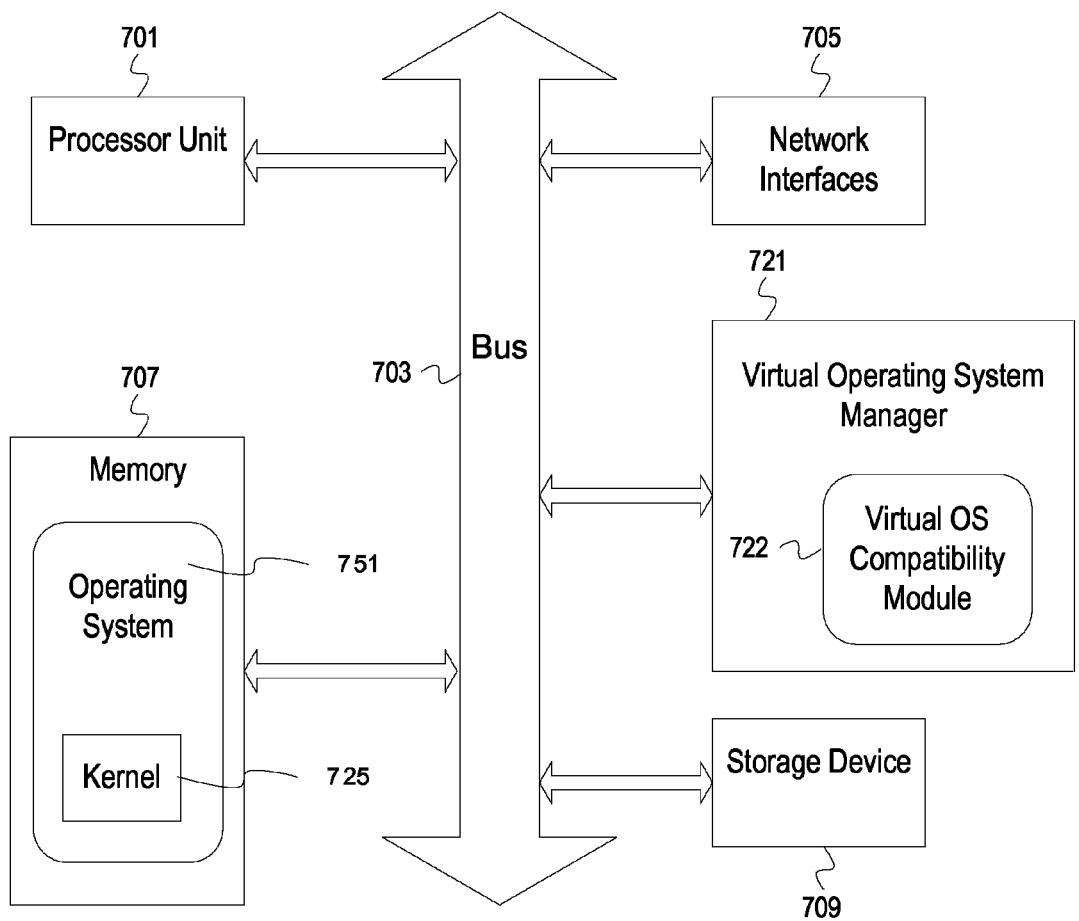
FIG. 7 depicts an example computer system.

FIG. 7 depicts an example computer system 700. The computer system 700 includes a processor unit 701 (possibly including multiple processors, multiple cores, multiple nodes, and/or implementing multi-threading, etc.). The computer system 700 includes memory 707. The memory 707 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable storage media. The computer system 700 also includes a bus 703 (e.g., PCI bus, ISA, PCI-Express bus, HyperTransport® bus, InfiniBand® bus, NuBus bus, etc.), a network interface 705 (e.g., an ATM interface, an Ethernet interface, a Frame Relay interface, SONET interface, wireless interface, etc.), and a storage device(s) 709 (e.g., optical storage, magnetic storage, etc.). The computer system 700 also includes a virtual operating system manager 721. The virtual operating system manager 721 can manage resources of the computer system 700 that are shared between one or more instances of operating systems (i.e., virtual operating systems) that may run on, or that are controlled by, the computer system 700. The virtual operating system manager 721 can include individual components or parts that manage different aspects or parts of the virtual operating system and shared resources. For example, the virtual operating system manager 721 can include a virtual operating system compatibility module 722 that can manage use and requests of global symbols accessible via special files such as /dev/kmem and /dev/mem. Some embodiments also include an operating system 751 and a kernel 725 that can, work with the virtual operating system manager 721, the virtual operating system compatibility module 722, and/or other components of the computer system 700, to translate data structures associated with symbols, cache data regarding secondary data structures associated with the global symbols, and perform other actions associated with symbol use and/or translation of kernel symbols accessible via the special files for multiple operating systems. Any one of these functionalities may be partially (or entirely) implemented in hardware and/or on the processing unit 701. For example, the functionality may be implemented with an application specific integrated circuit, in logic implemented in the processing unit 701, in a co-processor on a peripheral device or card, etc. Further, realizations may include fewer or additional components not illustrated in FIG. 7 (e.g., video cards, audio cards, additional network interfaces, peripheral devices, etc.). The processor unit 701, the storage device(s) 709, and the network interface 705 are coupled to the bus 703. Although illustrated as being coupled to the bus 703, the memory 707 may be coupled to the processor unit 701.

While the embodiments are described with reference to various implementations and exploitations, it will be understood that these embodiments are illustrative and that the scope of the inventive subject matter is not limited to them. In general, techniques for managing operating systems as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A non-transitory computer program product for converting data associated with a symbol accessible via a special file for different versions of an operating system, the non-transitory computer program product comprising:
a non-transitory computer readable storage medium having computer readable program code embodied therewith, the computer readable program code comprising:
computer readable program code configured to, access the data associated with the symbol in response to a request to access the symbol via the special file, wherein the special file is for accessing kernel memory directly, wherein an application of a first of a plurality of instances of the operating system requests the access to the symbol, wherein the symbol is accessible via a second of the plurality of instances of the operating system, wherein the second of the plurality of instances of the operating system manages the plurality of instances, wherein the plurality of instances of the operating system share a kernel, wherein the first of the plurality of the instances of the operating system is a first version of the operating system, wherein the second of the plurality of instances of the operating system is a second version of the operating system, and wherein the data is in a first data format that is compatible with the second version of the operating system
determine that the first data format for the data is incompatible with the first version of the operating system,
convert the data from the first data format to a second data format that is compatible with the first version of the operating system, and
return the data in the second data format in response to the request to access the symbol.

2. The non-transitory computer program product of claim 1, said computer readable program code being further configured to,
generate a symbol table prior to detecting the request to access the symbol,
store a symbol identifier for the symbol in an entry of the symbol table,
store a data address for the data associated with the symbol in the entry of the symbol table,
after receiving the request to access the symbol, identify the entry in the symbol table for the symbol using the symbol identifier,
determine, from the entry, the data address, and
use the data address to access the data.

3. The non-transitory computer program product of claim 2, said computer readable program code being further configured to,
detect a data handler stored in the entry for the symbol in the symbol table,
invoke the data handler, and
provide the data address to the data handler, wherein the data handler is configured to access the data address, and perform a translation operation that converts the data to the second data format.

4. The non-transitory computer program product of claim 2, said computer readable program code configured to,
generate an embedded pointer structure within the symbol table prior to detecting the request to access the symbol,
store a pointer address for an embedded pointer associated with the symbol within the entry,
after receiving the request to access the symbol, identify the pointer address,
use the pointer address to access an embedded pointer entry in the symbol table, wherein the embedded pointer entry includes an offset value that indicates a location within the data that specifies a secondary data address for secondary data associated with the embedded pointer, and
use the secondary data address to access the secondary data structure.

5. The non-transitory computer program product of claim 4, said computer readable program code being further configured to
generate a cache,
generate a cache entry in the cache that is associated with a process of the first of the plurality of instances of the operating system used by the application to make the request to access the symbol,
store a process identifier in the cache entry, and
store the secondary data address in the cache entry.

6. The non-transitory computer program product of claim 5, said computer readable program code being further configured to
store a symbol identifier in the embedded pointer entry before generating the cache, store the symbol identifier in the cache entry after generating the cache entry, and
use the symbol identifier to relate the embedded pointer entry and the cache entry.

7. The non-transitory computer program product of claim 2, wherein the special file is either the /dev/kmem special file or the /dev/mem special file.

8. An apparatus comprising:
a processing unit;
a network interface; and
an operating system operable to, via the processing unit,
access data associated with a symbol in response to a request to access the symbol via a special file, wherein the special file is for accessing kernel memory directly, wherein an application of a first of a plurality of instances of the operating system requests the access to the symbol, wherein the symbol is accessible via a second of the plurality of instances of the operating system, wherein the second of the plurality of instances of the operating system manages the plurality of instances, wherein the plurality of instances of the operating system share a kernel, wherein the first of the plurality of the instances of the operating system is a first version of the operating system, wherein the second of the plurality of instances of the operating system is a second version of the operating system, wherein the data is in a first data format that is compatible with the second version of the operating system, and wherein the special file is either a /dev/kmem special file or a /dev/mem special file managed by the second of the plurality of instances of the operating system,
determine that the first data format for the data is incompatible with the first version of the operating system,
convert the data from the first data format to a second data format that is compatible with the first version of the operating system, and
return the data in the second data format in response to the request to access the symbol.

9. The apparatus of claim 8, wherein the operating system is further operable to
generate a symbol table prior to detecting the request to access the symbol,
store a symbol identifier for the symbol in an entry of the symbol table,
store a data address for the data associated with the symbol in the entry of the symbol table,
after receiving the request to access the symbol, identify the entry in the symbol table for the symbol using the symbol identifier,
determine, from the entry, the data address, and
use the data address to access the data.

10. The apparatus of claim 9, wherein the operating system is further operable to
detect a data handler stored in the entry for the symbol in the symbol table,
invoke the data handler, and
provide the data address to the data handler, wherein the data handler is configured to access the data address, and perform a translation operation that converts the data to the second data format.

11. The apparatus of claim 9, wherein the operating system is further operable to
generate an embedded pointer structure within the symbol table prior to detecting the request to access the symbol,
store a pointer address for an embedded pointer associated with the symbol within the entry,
after receiving the request to access the symbol, identify the pointer address; and
use the pointer address to access an embedded pointer entry in the symbol table, wherein the embedded pointer entry includes an offset value that indicates a location within the data that specifies a secondary data address for secondary data associated with the embedded pointer,
use the secondary data address to access the secondary data structure,
generate a cache entry that is associated with a process of the first of the plurality of instances of the operating system used by the application to make the request to access the symbol,
store a process identifier in the cache entry, and
store the secondary data address in the cache entry.

12. A non-transitory computer program product for reformatting data associated with a symbol accessible via a special file for different versions of an operating system, the non-transitory computer program product comprising:
a non-transitory computer readable storage medium having computer readable program code embodied therewith, the computer readable program code comprising:
computer readable program code configured to,
access the data associated with the symbol in response to a request to access the symbol via the special file, wherein the special file is for accessing kernel memory directly, wherein an application of a first of a plurality of instances of the operating system requests the access to the symbol, wherein the symbol is accessible via a second of the plurality of instances of the operating system, wherein the second of the plurality of instances of the operating system manages the plurality of instances, wherein the plurality of instances of the operating system share a kernel, wherein the first of the plurality of the instances of the operating system is a first version of the operating system, wherein the second of the plurality of instances of the operating system is a second version of the operating system, and wherein the data is in a first data format that is compatible with the second version of the operating system,
determine that the first data format for the data is incompatible with the first version of the operating system,
reformat the data from the first data format into a second data format that is compatible with the first version of the operating system,
detect a secondary data structure associated with the symbol,
store information for the secondary data structure in a cache associated with a computing process of the first of the plurality of instances of the operating system used by the application to make the request to access the symbol, and
return the data in the second data format in response to the request to access the symbol.

13. The non-transitory computer program product of claim 12, said computer readable program code being further configured to
generate a symbol table prior to detecting the request to access the symbol,
store a symbol identifier for the symbol in an entry of the symbol table,
store a data address for the primary data structure associated with the symbol in the entry of the symbol table, after receiving the request to access the symbol, identify the entry in the symbol table for the symbol using the symbol identifier, determine, from the entry, the primary data structure address, and use the primary data structure address to access the primary data structure.

14. The non-transitory computer program product of claim 13, said computer readable program code being further configured to generate the cache, generate a cache entry in the cache that is associated with the computing process, store a process identifier in the cache entry, and store a secondary data structure address in the cache entry.

15. The non-transitory computer program product of claim 14, said computer readable program code being further configured to determine an additional data structure address associated with the cache entry, read an additional data structure associated with the additional data structure address, generate an additional cache entry that is associated with the computing process;

store the process identifier in the additional cache entry, and store the additional data structure address in the additional cache entry.

16. The non-transitory computer program product of claim 14, said computer readable program code being further configured to store a symbol identifier in an embedded pointer entry associated with the entry for the global symbol table before generating the cache, store the symbol identifier in the cache entry after generating the cache entry, and use the symbol identifier to relate the embedded pointer entry and the cache entry.

17. The non-transitory computer program product of claim 12, wherein the special file is either the /dev/kmem special file or the /dev/mem special file.

* * * * *